L. M. ASPINWALL.
HORIZONTAL STEERING GEAR FOR TORPEDOES.
APPLICATION FILED MAY 15, 1919.

1,360,259.

Patented Nov. 30, 1920.

WITNESSES:
H. J. Shelhamer
D. C. Davis

INVENTOR
Louis M. Aspinwall
BY
Wesley G. Carr
ATTORNEY

UNITED STATES PATENT OFFICE.

LOUIS M. ASPINWALL, OF PITTSBURGH, PENNSYLVANIA, ASSIGNOR TO WESTINGHOUSE ELECTRIC & MANUFACTURING COMPANY, A CORPORATION OF PENNSYLVANIA.

HORIZONTAL STEERING-GEAR FOR TORPEDOES.

1,360,259.  Specification of Letters Patent.  Patented Nov. 30, 1920.

Application filed May 15, 1919. Serial No. 297,339.

*To all whom it may concern:*

Be it known that I, LOUIS M. ASPINWALL, a citizen of the United States, and a resident of Pittsburgh, in the county of Allegheny and State of Pennsylvania, have invented a new and useful Improvement in Horizontal Steering-Gear for Torpedoes, of which the following is a specification.

My invention relates to horizontal steering gear for torpedoes and it has for its object to provide apparatus of the character designated that shall be simple and effective in action and, at the same time, highly accurate in securing a steering control in the desired direction.

Figure 1:
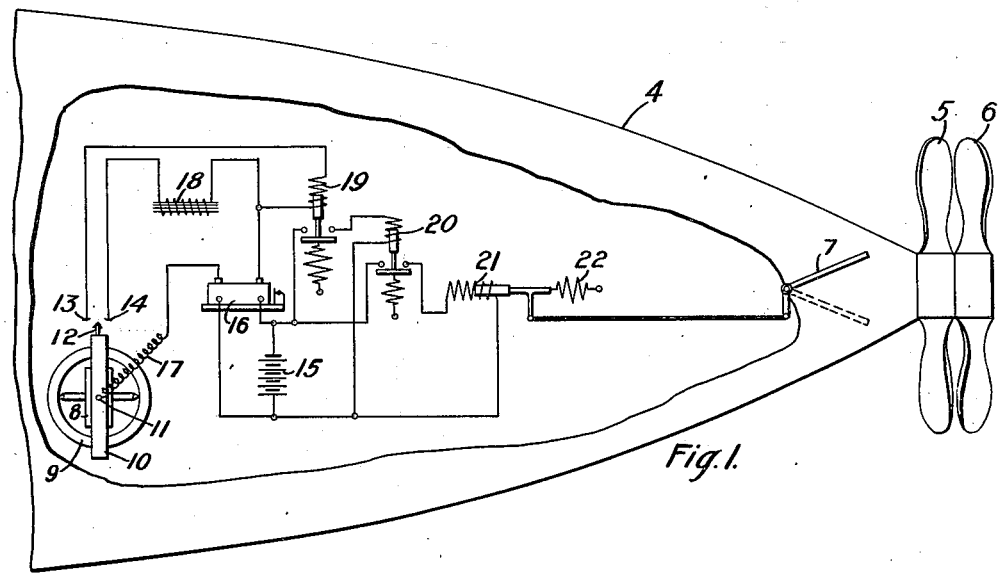
Figure 2:
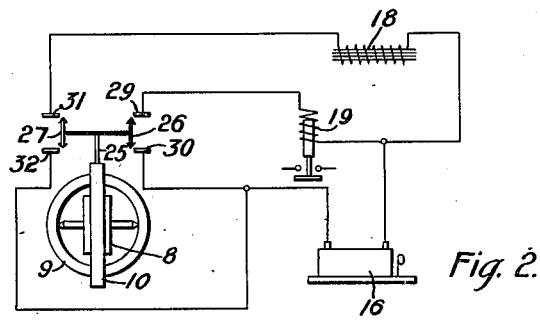

In the accompanying drawing, Figure 1 is a plan view of the after-body of a torpedo, with a diagrammatic showing of steering gear constructed in accordance with my invention; and Fig. 2 is a diagrammatic showing of a modification of the apparatus shown in Fig. 1.

It is customary to secure the horizontal steering of automotive devices by employing a gyroscope, the plane of rotation being determined initially so as to have a fixed relation to the direction the device is to pursue and the deflection of the steered body from the desired course causing the gyroscope to exert a controlling influence, either directly or indirectly, sufficient to bring the body back on its course.

In the past, the devices employed for securing the desired corrective impulses from the gyroscope have abstracted more or less energy therefrom, with the result that a slight precessing influence was imparted to the gyroscope and it was caused to depart from its initial plane. Thus, the fundamental base line from which the entire steering control is determined is disturbed and thereafter no amount of corrective apparatus suffices to restore the torpedo, or other automotive device, to a true course.

In accordance with the present invention, I provide the gyroscope frame with an electrode and I cause this electrode to move into proximity to an electrode mounted on the body of the torpedo when the torpedo has yawed to such an extent as to require corrective steering. The two electrodes do not come into contact but a source of high-potential electromotive force is in circuit therewith and causes current flow across the small intervening gap for the energization of a suitable translating device. Thus, no actual contact is established with the gyroscope itself and, consequently, no precessing effect is imparted thereto, and the gyroscope is free to rotate in its original plane throughout the travel of the automotive device.

Referring to the accompanying drawing for a more detailed understanding of my invention, I show a plane view of the afterbody of a self-propelling torpedo at 4, being provided with the usual oppositely-rotating propellers 5 and 6. The horizontal steering rudder is shown at 7 and is under the control of a gyroscopic wheel universally mounted in gimbal rings 9 and 10. The latter ring is pivoted at 11 on a vertical axis and, as the torpedo yaws in the one or the other direction, the tendency of the gyroscope to maintain its original plane of rotation causes relative rotation between the ring 10 and the body of the torpedo, about the axis 11.

The ring 10 carries an electrode 12 at its side and this contact member is disposed to swing in front of electrodes 13 and 14 mounted upon the body of the torpedo. The arrangement is such that the electrodes 13 and 14 are quite close to each other and, furthermore, the spacing of the electrode 12 therefrom is as small as is compatible with suitable mechanical clearance.

A source of electrical energy, such, for example, as a storage battery 15, is provided for the energization and the control of the main and auxiliary steering circuits of the torpedo and a source of high-tension current, such, for example, as an ordinary spark coil 16, is connected across the terminals thereof. One of the secondary or high-voltage terminals of the spark coil 16 is connected to the gyroscope electrode 12, as through a flexible lead 17. The remaining high-tension terminal of the coil 16 is connected to the electrode 14 through a reactance device 18 and also to the electrode 13 through the operating coil of a relay 19. The resistance and reactance of the devices 18 and 19 are substantially the same, so that the circuits from the electrodes 13 and 14 have practically the same impedance and time constant. The selection between the two electrodes is therefore very positive, being governed entirely by the relative lengths of the gaps 12 to 13 and 12 to 14.

The relay 19, which will hereinafter be called the primary relay, is wound for high voltage and controls the energization of a secondary relay 20 adapted to control relatively large currents. The relay 20 controls circuits to a powerful steering solenoid 21 arranged to operate in opposition to a spring 22.

The voltage of the coil 16 is sufficiently high to cause current flow from the electrode 12 to either the electrode 13 or the electrode 14, when swung into proximity thereto, although actual contact is not accomplished and, in fact, is usually so high that it could jump from electrode 12 to electrode 14 when these electrodes are most widely separated, were it not for the shunting effect of the lower-resistance path offered, at this time, through the electrode 13.

Having thus described the arrangement of a system embodying my invention, the operation thereof is as follows. The spring 22 is sufficiently powerful to throw the rudder 7 to the right when the solenoid 21 is deenergized, thus causing the torpedo to yaw to the right. This action causes the electrode 12 to approach the electrode 13 and permit the flow of high-tension current through the solenoid 19, in turn energizing the solenoid 20 and the solenoid 21. A preponderating force is developed in the latter solenoid, overcoming the tension of the spring 22 and swinging the rudder 7 to the left, causing the torpedo to yaw to the left.

When sufficient yawing or corrective steering has been developed, the electrode 12 approaches the electrode 14, and the current flow is transferred from the solenoid 19 to the reactive device 18, permitting the deenergization of the solenoids 19, 20 and 21 and the return of the rudder 7 to its righthand position, under the influence of the spring 22. This action is repeated periodically until the torpedo reaches its destination.

Particular attention is directed to the fact that at no time does the electrode 12 come into actual contact with any body exterior to the gyroscope frame so that no mechanical impulse of any type is transferred to the gyroscope frame for the production of a precessing effect therein. Thus, the axis of rotation of the gyroscope 8 retains its initial direction and the torpedo is directed in accordance therewith throughout its course.

The function of the reactor device 18 is to cause the current flowing through the electrodes 13 and 14 to be the same. Thus, when the electrode 12 is in its intermediate position, there is no more tendency of current flow in one direction than in the other direction.

The sole disturbing influence in the system of Fig. 1 is the lead wire 17 conveying current to the gyroscope frame. The necessity of slightly bending this wire as the gyroscope yaws abstracts a slight amount of energy from the gyroscopic frame. I am enabled to eliminate even this slight disturbing influence by employing the arrangement shown in Fig. 2. The frame 10 is arranged, as before, and carries an arm 25 bearing two conducting members 26 and 27, insulated from each other. The member 26 is arranged to move in between electrodes 29 and 30 mounted on the torpedo frame and, similarly, the member 27 is arranged to move in between electrodes 31 and 32 carried by the torpedo frame. Upon yawing of the torpedo toward the right, the member 26 moves between the members 29 and 30 without touching either of them. The members 29 and 30 are connected respectively to the high-tension terminals of the coil 16, and discharge takes place from the electrode 30 through the member 26 and the electrode 29 and thence, through the coil 19, to the remaining high-tension terminal of the device 16. The action of the relay 19, in controlling the torpedo, is the same as that in Fig. 1, the sole difference being that the high-potential current jumps across a small gap to the gyroscope electrode instead of flowing therethrough through a flexible conductor and thus absolutely no disturbing mechanical influences are imparted thereby from the gyroscopic frame, as would be developed by a flexible lead.

While I have described my invention in two forms, it is not so limited but is susceptible of various other changes and modifications without departing from the spirit thereof and I desire, therefore, that only such limitations shall be placed thereupon as are imposed by the prior art or as are specifically set forth in the appended claims.

I claim as my invention:

1. A circuit-controlling device comprising three adjacent electrodes, a source of electromotive force in circuit therewith, two of said electrodes being arranged in parallel relation in said circuit, means for varying the relative lengths of the discharge gaps between the remaining electrode and said parallel-related electrodes, said electromotive force being of sufficient magnitude to cause a discharge over the shorter of said gaps, and a translating device in circuit with one of said parallel-related electrodes.

2. A circuit-controlling device as specified in claim 1, characterized by the fact that the parallel circuits of the parallel-related electrodes have equivalent electrical properties.

3. A circuit-controlling device comprising two adjacent fixed electrodes, a moving electrode arranged to have a lateral motion with respect to said fixed electrodes so as to approach the one and recede from the other, or vice versa, without contacting therewith, a source of electromotive force in circuit with said electrodes, said fixed electrodes being arranged in parallel relation in said circuit, said electromotive force being of sufficient magnitude to cause a discharge between said moving electrode and the nearer of said fixed electrodes, and a translating device in circuit with one of said fixed electrodes.

4. A directive means for guiding an automotive body on a predetermined course, comprising a steering member for causing said body to alter its course, three adjacent electrodes, a source of electromotive force in circuit therewith, two of said electrodes being arranged in parallel relation in said circuit, means responsive to deviations of said body from the predetermined course for varying the relative lengths of the discharge gaps between the remaining electrode and said parallel-related electrodes, said electromotive force being of sufficient magnitude to cause a discharge over the shorter of said gaps, and means responsive to the selective action of said discharge over whichever gap is the shorter at any instant for effecting the movement of the steering member in one direction or the other according as one gap or the other is discharging.

5. In a gyroscopic steering device for automotive bodies, the combination with a gyroscope, of an electrode carried thereby, two electrodes carried by the body and so disposed that one is approached and the other left by the gyroscope electrode when said body yaws in one direction and conversely when said body yaws in the other direction, a source of electromotive force in circuit with said electrodes, said body electrodes being arranged in parallel relation in said circuit and said electromotive force being of sufficient magnitude to cause current flow between the gyroscope electrode and the nearer body electrode, and a translating device adapted to develop a steering impulse in circuit with at least one body electrode.

6. In a gyroscopic steering device for automotive bodies, the combination with means normally tending to yaw said body in one direction, of a gyroscope carrying an electrode, two electrodes carried by said body and so disposed that one electrode is approached and the other left by said gyroscope electrode when said body yaws in response to said means and vice versa, a source of electromotive force in circuit with said electrodes and of sufficient magnitude to cause current flow between said gyroscope electrode and the nearer body electrode, said body electrodes being in parallel relation in said circuit, and a translating device in circuit with the electrode that is approached when said body yaws in response to said means, said translating device being arranged to cause the development of a preponderating yawing force in the other direction when energized.

In testimony whereof I have hereunto subscribed my name this 26th day of April, 1919.

LOUIS M. ASPINWALL.